March 20, 1945.                 F. L. WHITE                    2,371,723
                      AUTOMATIC ELECTRICAL WATER HEATER
                  Filed March 25, 1944          2 Sheets-Sheet 1
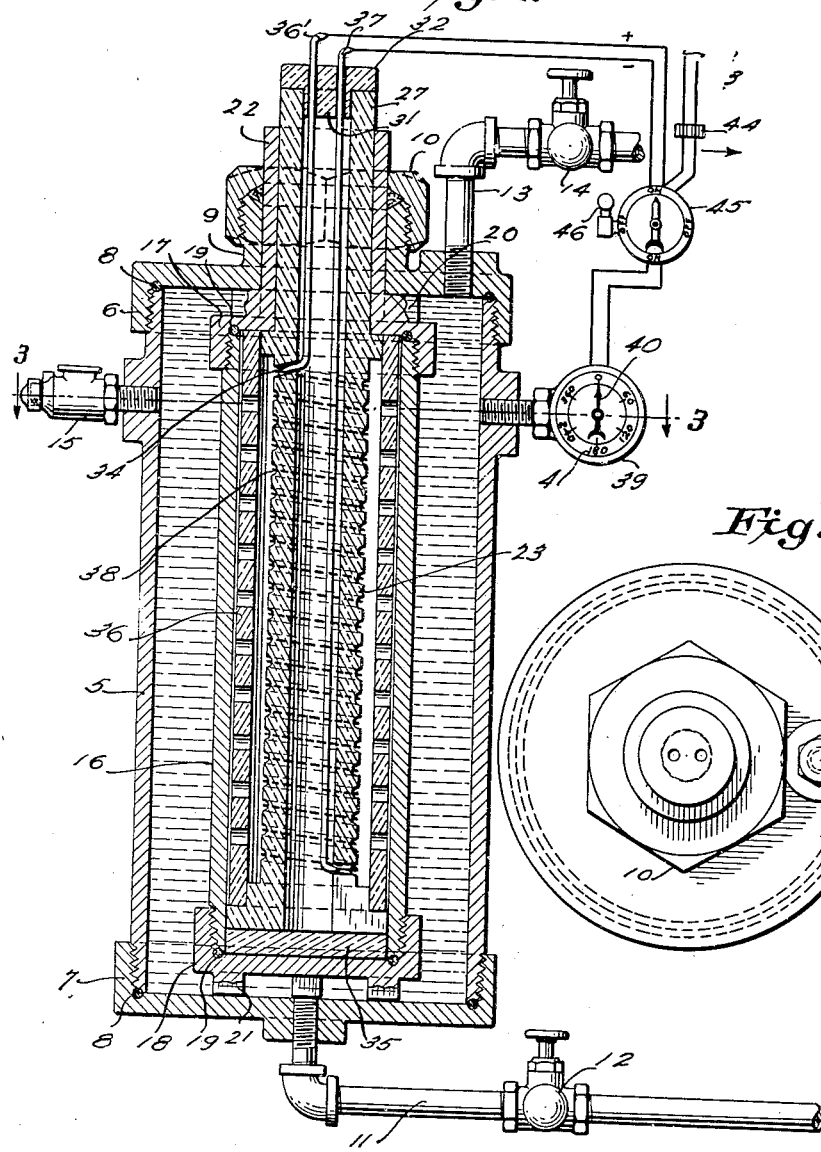
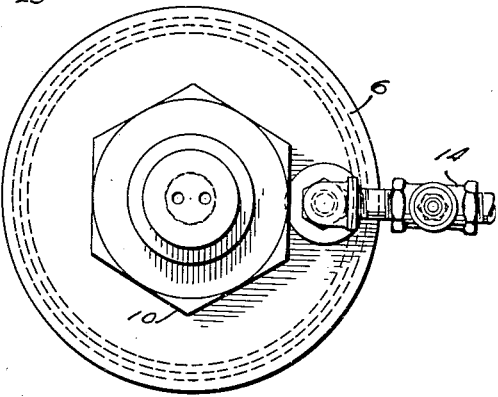
Inventor:
*Fitzhugh Lee White,*
By *Clarence A. O'Brien*
and *Harvey B. Jacobson*
                                    Attorneys March 20, 1945.   F. L. WHITE   2,371,723
AUTOMATIC ELECTRICAL WATER HEATER
Filed March 25, 1944   2 Sheets-Sheet 2
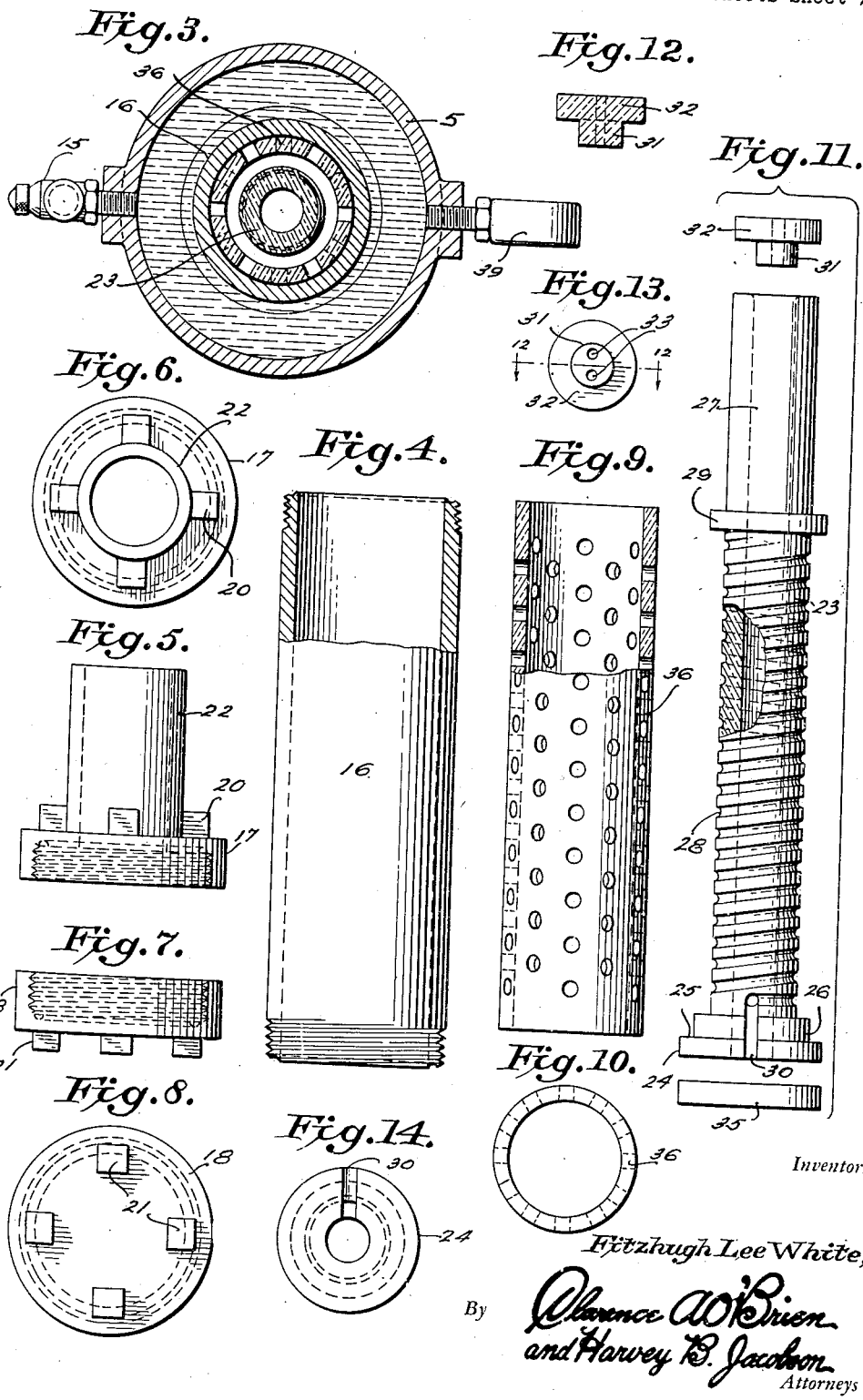
Inventor:
Fitzhugh Lee White,
By Clarence A. O'Brien
and Harvey B. Jacobson
Attorneys Patented Mar. 20, 1945

2,371,723

UNITED STATES PATENT OFFICE 2,371,723

AUTOMATIC ELECTRICAL WATER HEATER

Fitzhugh Lee White, South Norfolk, Va.

Application March 25, 1944, Serial No. 528,126

4 Claims. (Cl. 219—39)

This invention relates to electrical water heaters, and the primary object of the invention is to provide an automatic heater of this kind which may be safely placed in general use.

A further object of the invention is to provide an electrical water heater which is simple, compact and durable in construction, easy to assemble or take apart for production or repair, and so constructed as to insure against short-circuiting.

Another object of the invention is to provide an electrical water heater wherein the wires and heating coil within the heater are effectively supported and insulated from adjacent metallic parts of the heater, and wherein the heating unit is rigidly mounted in place in a simple and efficient manner to provide for effective radiation of heat to the water and circulation of the water about the heating unit.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a central vertical sectional view of an electrical water heater embodying the present invention.

Figure 2 is a top plan view thereof.

Figure 3 is a horizontal section taken on line 3—3 of Figure 1.

Figure 4 is a view partly in elevation and partly in longitudinal section of the body of the casing of the heating unit.

Figure 5 is an elevational view of the upper cap and centering sleeve for the casing body of Figure 4.

Figure 6 is a top plan view of the cap and centering sleeve shown in Figure 5.

Figure 7 is an elevational view of the lower cap for the body shown in Figure 4.

Figure 8 is a bottom plan view of the cap shown in Figure 7.

Figure 9 is a view similar to Figure 4 of the outer insulating sleeve of the heating unit.

Figure 10 is an end elevational view of the sleeve shown in Figure 9.

Figure 11 is a developed elevational view showing the parts of the inner insulator of the heating unit in disassembled relation, one of the parts being partly broken away and in section.

Figure 12 is a central sectional view of the insulating plug forming part of the construction shown in Figure 11, and taken on the plane of line 12—12 of Figure 13.

Figure 13 is a bottom plan view of the plug shown in Figure 12.

Figure 14 is a bottom plan view of the intermediate insulator part shown in Figure 11.

Referring in detail to the drawings, the illustrated embodiment of the invention includes an outer metallic water tank or casing composed of a cylindrical body 5 having caps 6 and 7 threaded or otherwise secured on the upper and lower ends thereof and suitably sealed, as at 8, against leakage of water from the casing. The upper cap 6 has a central tubular boss 9 projecting upwardly therefrom and forming part of a packing gland including a packing compressing nut 10 threaded on the boss 9. The bottom cap 7 has a central opening receiving the discharge end of a water supply pipe 11 in which is located a manually operable shut-off valve 12. Also, the upper cap 6 has an opening near one side receiving the end of an outlet or discharge pipe 13 in which is provided a manually operable shut-off valve 14. The tank or casing is provided at one side and near the top with a suitable automatic pressure relief valve 15.

Located within the tank is a heating unit including an outer imperforate metallic casing 16 having caps 17 and 18 threaded or otherwise secured on the upper and lower ends thereof and suitably sealed, as at 19, against leakage of water into the casing of the heating unit. These caps 17 and 18 have spaced lugs 20 and 21 arranged to abut the caps 6 and 7 and space the ends of the heating unit from the ends of the outer water tank or casing so that free circulation of the water between the ends of the tank and the heating unit may take place. The heating unit is disposed in spaced concentric relation to and within the tank or outer casing and is centered in this position by means of an integral centering sleeve 22 provided on the upper cap 17 of the heating unit and snugly fitting in and projecting upwardly through the boss 9 and its nut 10. The nut 10 is adjusted to compress the packing of the packing gland and prevent leakage of water from the outer casing or tank between the sleeve 22 and the boss 9.

The heating unit includes an insulator having an inner portion composed of three parts, as shown in Figure 11. The part 23 consists of an elongated tubular sleeve of insulating material formed with a head 24 at its lower end which is of a diameter to fit the inner diameter of the casing 16. This head has its upper portion reduced to provide a shoulder 25 for a purpose which will presently become apparent, and a portion of smaller diameter above the shoulder, as at 26. The part 23 also has a smooth cylindrical upper end portion 27 and a major lower portion formed with an exterior spiral groove 28, an annular flange 29 being formed on the part 23 between the portions 27 and 28, which is of a diameter similar to that of the head portion 26. In addition, the part 23 is provided at its lower end with a longitudinally disposed slot 30 through one side thereof and opening at this side and also at the bottom of the part 23, said slot also terminating at the top coincident with the adjacent end of the groove 28. A plug 31 is received in the upper end of the part 23, and has a head 32 which rests upon the upper end edge of the part 23. A pair of small openings 33 are provided through the plug 31, and another opening 34 is provided through the part 23 coincident with the upper end of the groove 28, as shown in Figure 1. A disc 35 of insulating material is fitted in the casing 16 and upon the bottom cap 18, and the part 23 is arranged in casing 18 with its lower end resting upon the disc 35 so that the latter closes the lower end of the part 23 and its slot 30. The insulator further includes an outer perforated protective sleeve 36 of insulating material which fits in the casing 16 and whose lower end fits about the reduced head portion 26 and rests upon the shoulder 25 of the head 24. The flange 29 fits snugly in the upper end of the sleeve 36 so that the latter is mounted in spaced concentric relation to the portion of the part 23 which is provided with the groove 28. Sleeve 36 contacts the cap 17 at its upper end.

Extending through the openings 33 of the plug 31 are feed and return wires 36' and 37. Feed wire 36' extends downwardly into the upper portion of part 23 and then outwardly through the opening 34 where it connects with the heating coil 38 wound in the groove 28. Wire 37 extends downwardly through the part 23 to a point near the top of the slot 30 where it connects with the adjacent end of the heating coil 38 that is brought inwardly through said slot 30. The slot 30 facilitates connection of wire 37 with the heating coil at this end, and disc 35 and sleeve 36 will prevent contact of the coil or wires with the casing of the heating unit in case they should become broken, thereby effectively preventing any possibility of short-circuiting within the casing of the heating unit. The perforations of sleeve 36 permit passage of heat to the casing 16 so that the latter may be effectively heated by the heating coil for having its heat radiated to the water surrounding casing 16 and contained in the water tank of the heater. It will be noted that the upper smooth portion 27 of insulator part 23 fits snugly in the centering sleeve 22 and projects above the latter. The plug 31 may be secured in place in a suitable way, and the cap 17 effectively holds the insulator in place when seated upon the cap 18.

An adjustable thermostatic control switch 39 is carried by the water tank 5 and has its thermosensitive element subjected to the temperature of the water in said tank 5. This switch may be of any well known or preferred type of construction wherein a pointer 40 is movable over a graduated dial 41 to set the switch for operation at any desired temperature of the water. The operation of this type of switch is such that when the water is heated above the temperature for which the switch is set, said switch will automatically turn off the current to the heating coil 38, and when the temperature of the water lowers below the temperature for which the switch is set, said switch will automatically close the circuit of the heating coil 38 and place said coil in operation. The current is derived from feed wires 42 and 43 extending from any suitable source of electricity and having a fuse block 44 interposed therein. A manually operable switch 45 is provided for controlling the flow of current to the thermostatic switch 39, so that it is necessary to close the switch 45 in order to place the heater in operation. When switch 45 is closed, the operation of the heater will be entirely automatic for furnishing water heated to the desired or predetermined temperature. A pilot light 46 may be provided to indicate when the switch 45 is turned on, thereby minimizing the likelihood of leaving the switch 45 turned on when use of the heater is not desired. In case the heater should be left turned on with the valves 12 and 14 closed, or in case the switch 45 is turned on and the thermostatic switch 39 does not function properly, the safety relief valve 15 will automatically open and relieve excessive pressure from the water tank.

From the foregoing description, it is believed that the construction and operation, as well as the advantages, of the present invention, will be readily understood and appreciated by those skilled in the art. It will be seen that the heater may be safely placed in general use and that it is well adapted to meet with the requirements for a successful commercial use, as well as to carry out the stated objects of the invention. Minor changes in details of construction illustrated and described are contemplated, such as fall within the spirit and scope of the invention as claimed.

What I claim is:

1. An electrical water heater including a water tank having end walls at the top and and bottom thereof, the top end wall being formed with a central upstanding hollow boss forming part of a packing gland, inlet and outlet connections for said tank, a heating unit disposed centrally in the tank and resting upon the bottom of the latter, said heating unit including an outer metallic casing having end walls provided with spaced lugs abutting the end walls of the water tank to space the ends of the heating unit from the ends of the water tank, the upper end wall of the heating unit casing having an upstanding sleeve snugly fitting in and projecting upwardly through the packing gland, and a heating element in the casing of the heating unit including an inner insulator part having a heating coil wound thereon and provided with an upper portion projecting upwardly through and fitting in said sleeve.

2. An electrical water heater including a water tank having end walls at the top and bottom thereof, the top end wall being formed with a central upstanding hollow boss forming part of a packing gland, inlet and outlet connections for said tank, a heating unit disposed centrally in the tank and resting upon the bottom of the latter, said heating unit including an outer metallic casing having end walls provided with spaced lugs abutting the end walls of the water tank to space the ends of the heating unit from the ends of the water tank, the upper end wall of the heating unit casing having an upstanding sleeve snugly fitting in and projecting upwardly through the packing gland, and a heating element in the casing of the heating unit including an inner insulator part having a heating coil wound thereon and provided with an upper portion projecting upwardly through and fitting in said sleeve, said inner part of the insulator comprising a tubular sleeve having an external groove formed in the outer surface of the lower portion thereof, the heating coil being wound in said groove and having its ends extending into the insulator sleeve, and feed and return wires connected to the ends of the heating coil and passing upwardly through said inner insulator part.

3. In an electrical water heater, a heating unit including an imperforate metallic outer casing having end walls, one of said end walls being provided with a projecting central sleeve, an inner insulator part comprising an elongated tubular sleeve formed with a head at its lower end and an annular flange near its upper end, the portion of said inner part between said head and said flange being formed with an external spiral groove, the portion of the insulator part above said flange snugly fitting in and projecting through the sleeve of the casing, the head of said insulator part having its upper portion reduced in diameter, an outer perforated protective sleeve fitted in the casing and having its lower end fitted over the reduced portion of the head of the inner insulator part and its upper portion fitted over said flange of the inner insulator part, said perforated insulator sleeve abutting an end of the casing at one end and the head of the inner insulator part at the other end.

4. In an electrical water heater, a heating unit including an imperforate metallic outer casing having end walls, one of said end walls being provided with a projecting central sleeve, an inner insulator part comprising an elongated tubular sleeve formed with a head at its lower end and an annular flange near its upper end, the portion of said inner part between said head and said flange being formed with an external spiral groove, the portion of the insulator part above said flange snugly fitting in and projecting through the sleeve of the casing, the head of said insulator part having its upper portion reduced in diameter, an outer perforated protective sleeve fitted in the casing and having its lower end fitted over the reduced portion of the head of the inner insulator part and its upper portion fitted over said flange of the inner insulator part, said perforated insulator sleeve abutting an end of the casing at one end and the head of the inner insulator part at the other end, said inner insulator part having a slot through one side thereof and through the head of the same, the upper portion of said slot communicating with the spiral groove at its lower end, an opening being provided through the inner insulator part in registry with the upper end of said groove, and feed wires extending into the inner insulator part and connecting with the ends of the heating coil through said slot and said opening.

FITZHUGH LEE WHITE.